PHASE CONTROLLED ALTERNATING CURRENT CIRCUIT

Filed Aug. 8, 1966

INVENTORS
John Misencik
BY Bung C. Lee
Wooster, Davis & Cifelli
ATTORNEYS

United States Patent Office 3,434,039
Patented Mar. 18, 1969

3,434,039

PHASE CONTROLLED ALTERNATING CURRENT CIRCUIT

John Misencik, Shelton, and Sung C. Lee, Bridgeport, Conn., assignors to Harvey Hubbell, Incorporated, Bridgeport, Conn., a corporation of Connecticut Filed Aug. 8, 1966, Ser. No. 570,798
U.S. Cl. 323—22 9 Claims
Int. Cl. G05f 1/44

ABSTRACT OF THE DISCLOSURE

A phase controlled circuit useable, for example, as a light dimmer. A pair of silicon controlled rectifiers are connected in reversed parallel relationship in series with the load. A time-variable triggering circuit, including a pair of capacitors interconnected through a three-layer diode, has its output connected to one of the rectifiers and to the primary of a two-winding transformer. When the voltage across the diode builds to its breakover value, it passes a current pulse to the primary winding and, if this occurs during the proper half cycle, renders the rectifier conductive. The secondary of the transformer is connected to the other rectifier and is polarized to trigger it into conduction during the half cycle in which the first rectifier would be non-conductive.

This invention relates to a phase controlled alternating current circuit and, more particularly, to such a circuit which is constructed of solid state elements and is particularly well suited for light dimming.

A number of attempts have been made to produce light dimming circuits. However, the circuits which have been produced by the prior art lack certain desirable characteristics. For example, one class of dimming circuit employs some type of power consuming device, such as a rheostat, for dropping the voltage at the load. Such a device is extremely inefficient because the rheostat consumes power whenever the dimming function is utilized. In addition, the rheostats are relatively large and suitable provision must be made for the dissipation of heat. A second approach has utilized variable power transfer devices—such as a transformer with variable coupling. However, these devices are expensive and bulky. In order to render light dimming practical for ordinary residential applications, it is necessary that the dimmer be small in size and relatively inexpensive. Attempts have been made to construct such dimmers by means of solid state controlled electronic elements, such as silicon controlled rectifiers, and to utilize phase control for gating such elements. The difficulties with these devices have been numerous. For example, relatively complex circuitry is required in many instances. Many of the circuits employ half, rather than full, wave control. For full-wave control with single controlled elements, it has usually been necessary to include a full-wave rectifier in the circuit. Where dual solid state devices have been connected in reverse parallel relationship it has been necessary to provide some means of isolation between the gate circuits of the two devices. Furthermore, the triggering circuits are often highly complex. Still another disadvantage has been that such circuits often remain electrically connected to the power source and load even when in the non-dimming condition.

Accordingly, it is primary object of the present invention to provide an improved phase controlled alternating current circuit. Other objects are to provide such a circuit which is formed from solid state components; which achieves full-wave control; wherein the dimming circuitry may be completely isolated electrically from the load and power supply when dimming is not required; and wherein full-wave control is achieved in a circuit sufficiently small and inexpensive to be practical for residential light dimming applications.

Figure 1:
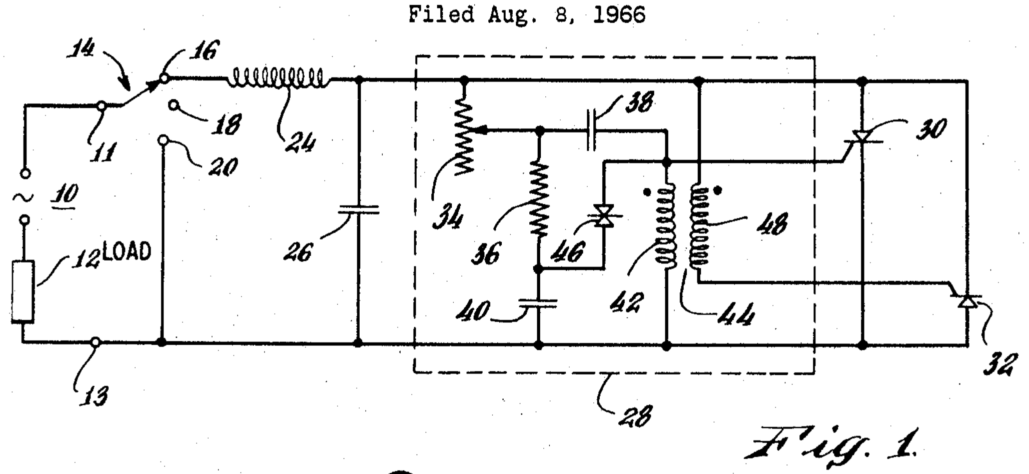
Figure 2:
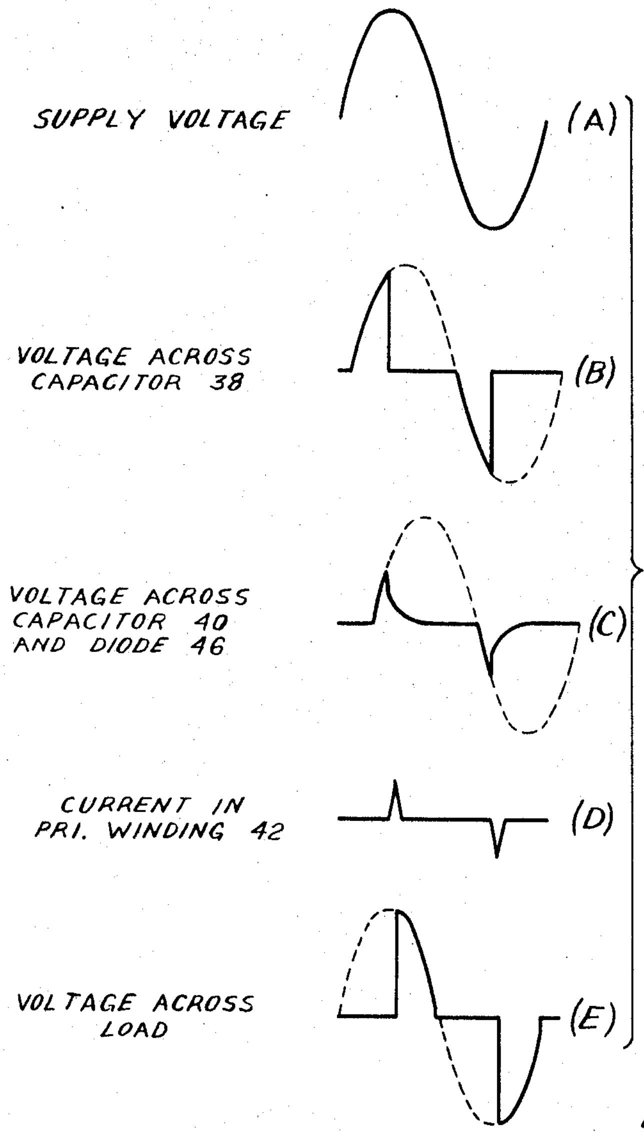

The manner in which the foregoing objects are achieved will be more apparent from the following description, the appended claims, and the figures of the attached drawing wherein:

FIG. 1 is a circuit diagram of a dimmer constructed in accordance with this invention; and FIG. 2 is a series of wave forms illustrating the operation of the dimmer circuit of FIG. 1.

FIG. 1 illustrates a circuit in accordance with this invention connected in series with an alternating current power source 10 and an electrical load 12 at terminals 11, 13. The circuit include a three-position main switch 14 having a "dimming" terminal 16, an "off" terminal 18, and an "on" terminal 20. The "on" terminal 20 is connected directly to the load 12 through terminal 13 so that, when the switch is in its lowermost position, the load is connected directly across the power source 10 and the remainder of the dimming circuit is completely isolated from both the load and the power source. Connected to the "dimming" terminal 16 is an inductance 24 which, together with the capacitor 26, forms an L-type filter for eliminating radio interference.

Connected in parallel across the capacitor 26 are a trigger circuit 28 and a pair of silicon controlled rectifiers 30, 32 which have their anodes and cathodes in reversed relationship. The characteristics of silicon controlled rectifiers are well known. These devices will conduct current in one direction only and then only when both the anode and the gate are positive with respect to the cathode and when the gate-cathode current is sufficient to initiate conduction.

The trigger circuit 28 provides the necessary voltages to the gates of the controlled rectifiers to permit conduction of the rectifiers at the desired phase angle of the power supply voltage. The trigger circuit comprises a variable resistor 34 having its wiper connected to a fixed resistor 36 and a capacitor 38. Another capacitor 40 is connected in series with resistors 34 and 36 across the controlled rectifiers. The primary winding 42 of an air core transformer 44 is connected in series with capacitor 38 and across resistor 36 and capacitor 40. A three-layer diode 46 is connected between the juncture of resistor 36 and capacitor 40 and the juncture of capacitor 38 and primary winding 42. The secondary winding 48 of transformer 44 is connected across the gate-cathode circuit of rectifier 32. The primary winding 42 of the transformer is connected across the gate-cathode circuit of rectifier 30. The polarities of the transformer windings are reversed relative to the respective gates as illustrated.

Assuming that the load 12 which is to be controlled is an incandescent lighting load, it will be apparent that, when the main switch 14 is positioned at terminal 18, there will be no power supplied to either the dimming circuit or to the load so that the lights will be off. Moving the switch to terminal 20 will apply full power to the load so that the lights will be in their bright condition while the dimming circuit remains completely separated electrically from the power supply. Moving the switch to the terminal 16, as illustrated, permits the lights to be selectively dimmed.

The operation of the dimming circuit will now be described with particular reference to FIG. 1 and to the wave forms illustrated in FIG. 2. Wave form A of FIG. 2 illustrates the usual sinusoidal voltage available from power source 10. As the resistance of primary winding 42 is quite low (on the order of 1 ohm) the capacitor 38 may be considered to be in series solely with variable resistor 34, the series combination being directly across the power supply. The voltage across this capacitor will, therefore, begin to build in the same sinusoidal fashion as the supply voltage but with a silght lag due to the time constant introduced by resistor 34. This initial rise is illustrated in FIG. 2B. The three-layer diode 46 conducts in either direction, but only when the voltage across it exceeds its rated value. For purposes of illustration, in a residential light dimming circuit the breakover voltage of diode 46 may be on the order of 34 volts. While diode 46 remains non-conductive, the capacitor 40 and resistor 36 may be considered to be in parallel with capacitor 38. Accordingly, the voltage across capacitor 40 will also begin to build in a sinusiodal fashion, but with a further time lag introduced by resistor 36. The beginning of this voltage rise is illustrated by FIG. 2C.

Assuming the upper terminal of source 10 to be positive and the lower terminal negative, it will now be apparent that the upper plate of capacitor 40 goes positive while the lower plate of capacitor 38 goes negative. The resultant voltage across diode 46 is essentially the same as across capacitor 40. This voltage builds to the breakover value of diode 46, namely 34 volts. The diode then suddenly conduits, its voltage dropping rapidly to approximately 20 volts, and passing a pulse of current, as illustrated in FIG. 2D, to the primary winding 42 and also to the gate of controlled rectifier 30. The charge on capacitor 40 thereafter decays exponentially. During the positive half-cycle under consideration, the anode of rectifier 30 is positive and its cathode negative. Thus the current resulting from the positive voltage peak produced by the diode 46 triggers the rectifier into its "on" condition, permitting the source voltage to be applied to the load throughout the remainder of the half-cycle, as shown in FIG. 2E. This power flow terminates just prior to the time at which the source voltage reaches zero, when the current through the controlled rectifier is reduced below its rated holding value. During this half-cycle it will be noted that the controlled rectifier 32 is unable to conduct because of the improper polarities applied to its cathode and anode.

During the negative half-cycle, the operation is substantially identical but with the polarities reversed. However, rectifier 30 is now reversed and cannot conduct. The reversed current pulse through transformer primary winding 42 induces in secondary winding 48 a voltage which is of proper polarity to produce a positive voltage on the gate of rectifier 32. Accordingly, this rectifier conducts during the negative half-cycle.

As explained above, the transformer 44 generates a pulse of proper polarity to activate the gate of rectifier 32. It also serves an important second function by isolating the gates of the two controlled rectifiers. In the absence of such isolation, a leakage path will exist between the two rectifiers which is sufficiently great to actuate the gate and defeat the phase control feature of the circuit. It should also be noted that this function is performed by a single two-winding transformer rather than by a transformer with dual secondary windings.

Capacitor 38 has an important function in that it stores a residual charge. If the source voltage should drop momentarily due to heavy loading on the system, capacitor 38 restores energy into the phase control circuit allowing the circuit to be maintained at the desired level even during such abnormal conditions.

It will be obvious to those skilled in the art that the values of the various circuit elements may be selected as desired. However, in one actual embodiment designed for residential light dimming, the R.F. filter comprised an inductance 24 of 225 microhenries and a capacitance 26 of .047 microfarad. The resistor 34 had a value of 50,000 ohms and resistor 36 a value of 6,800 ohms. Capacitors 38 and 40 were each rated at .15 microfarad and diode 46 was a three-layer diode having a breakover voltage of 34 volts. Transformer 44 was an air core transformer having a 1:1 winding ratio with one hundred turns on each winding. The controlled rectifiers 30, 32 were silicon controlled rectifiers Motorola number 1604–4.

It will also be apparent to those skilled in the art that certain variations and modifications may be made in this invention without departing from its spirit and scope. For example, resistor 36 may be a variable resistance and could in fact be ganged with resistance 34. Also, the described circuit may be used in any application where phase control is desired and need not be limited to light dimming. Accordingly, it is to be understood that the foregoing description is intended to be illustrative only rather than limiting. This invention is limited only by the scope of the following claims.

What we claim as new and desire to secure by Letters Patent of the United States is:

1. A phase controlled alternating current circuit comprising: first and second terminals for connection in series with an alternating current power source and a load; solid state switching means electrically interconnecting said first and second terminals; a variable first resistor, a second resistor, and a first capacitor connected in series across said first and second terminals; a second capacitor; a transformer including a primary and a secondary winding, said primary winding and second capacitor being connected in series across said second resistor and first capacitor; pulse forming means connected between the juncture of said second resistor and first capacitor and the juncture of said second capacitor and primary winding to pass a triggering pulse when the voltage between said junctures exceeds a preselected value; and linking means for applying said triggering pulse to said solid state switching means.

2. A phase controlled alternating current circuit comprising: first and second terminals for connection in series with an alternating current power source and a load; a main switch connected to one of said first and second terminals and selectively operable to any of first and second closed circuit positions and an open circuit position; conductor means electrically interconnecting said first and second terminals through said main switch when said switch is in its first closed circuit position; solid state switching means electrically interconnecting said first and second terminals through said main switch when said main switch is in its second closed circuit position; a variable first resistor, a second resistor, and a first capacitor connected in series across said first and second terminals when said main switch is in its second closed circuit position; a second capacitor; a transformer including a primary and a secondary winding, said primary winding and second capacitor being connected in series across said second resistor and first capacitor; pulse forming means connected between the juncture of said second resistor and first capacitor and the juncture of said second capacitor and primary winding to pass a triggering pulse when the voltage between said junctures exceeds a preselected value; and linking means for applying said triggering pulse to said solid state switching means.

3. The circuit of claim 2 wherein said solid state switching means comprises first and second controlled rectifier means in reversed parallel relationship.

4. The circuit of claim 3 wherein said means for applying comprises: a secondary winding of said transformer connected to the gate of one of said controlled rectifier means; and conductor means connected from said pulse forming means to the other of said controlled rectifier means.

5. The circuit of claim 2 wherein said pulse forming means comprises breakdown means having a normally high impedance state but changing to a low impedance state upon application of a preselected breakdown voltage thereacross.

6. The circuit of claim 2 wherein said second capacitor is connected to the juncture between said first and second resistors.

7. The circuit of claim 6 wherein said solid state switching means comprises first and second controlled rectifier means, each including an anode, a cathode, and a gate, the anode-cathode circuits being in reversed parallel relationship.

8. The circuit of claim 7 wherein the gate-cathode circuit of said first controlled rectifier is connected across mary winding and the gate-cathode circuit of said second controlled rectifier is connected across said secondary winding.

9. The circuit of claim 8 wherein the polarities of the primary and secondary windings are reversed relative to the respective gates.

References Cited

UNITED STATES PATENTS

| | | | |
|---|---|---|---|
| 3,103,618 | 9/1963 | Slater | 323—22 |
| 3,146,392 | 8/1964 | Sylvan | 323—22 |
| 3,215,891 | 11/1965 | Fritz et al. | 315—272 X |
| 3,218,511 | 11/1965 | Rosenbaum | 315—207 |
| 3,249,807 | 5/1966 | Nuckolls | 323—22 X |

JOHN F. COUCH, *Primary Examiner.*

A. D. PELLINEN, *Assistant Examiner.*

U.S. Cl. X.R.

315—194, 251; 323—24, 36

UNITED STATES PATENT OFFICE

CERTIFICATE OF CORRECTION

Patent No. 3,434,039 March 18, 1969

John Misencik et al.

It is certified that error appears in the above identified patent and that said Letters Patent are hereby corrected as shown below:

Column 2, line 17, "include" should read -- includes --. Column 3, line 5, "silght" should read -- slight --; line 25, "conduits" should read -- conducts --. Column 5, line 9, after "across" insert -- said pri- --.

Signed and sealed this 31st day of March 1970.

(SEAL)
Attest:

Edward M. Fletcher, Jr.
Attesting Officer

WILLIAM E. SCHUYLER, JR.
Commissioner of Patents